US012335232B2

(12) United States Patent
Sengupta et al.

(10) Patent No.: US 12,335,232 B2
(45) Date of Patent: **\*Jun. 17, 2025**

(54) DISTRIBUTED IDENTITY-BASED FIREWALLS

(71) Applicant: VMware LLC, Palo Alto, CA (US)

(72) Inventors: Anirban Sengupta, Saratoga, CA (US); Subrahmanyam Manuguri, San Jose, CA (US); Mitchell T. Christensen, Livermore, CA (US); Azeem Feroz, San Jose, CA (US); Todd Sabin, Morganville, NJ (US)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,666

(22) Filed: Jul. 3, 2023

(65) Prior Publication Data

US 2023/0362130 A1 Nov. 9, 2023

Related U.S. Application Data

(63) Continuation of application No. 17/063,415, filed on Oct. 5, 2020, now Pat. No. 11,695,731, which is a
(Continued)

(51) Int. Cl.
*H04L 9/40* (2022.01)
*G06F 9/455* (2018.01)
*H04L 67/63* (2022.01)

(52) U.S. Cl.
CPC ...... *H04L 63/0218* (2013.01); *G06F 9/45558* (2013.01); *H04L 67/63* (2022.05); *G06F 2009/45595* (2013.01)

(58) Field of Classification Search
CPC ............... H04L 63/0218; H04L 67/327; G06F 9/45558
See application file for complete search history.

(56) References Cited

U.S. PATENT DOCUMENTS 5,826,051 A 10/1998 Porter et al.
5,950,195 A 9/1999 Stockwell et al.
(Continued)

FOREIGN PATENT DOCUMENTS

CN 1678993 A 10/2005
CN 102446118 A 5/2012
(Continued)

OTHER PUBLICATIONS

Author Unknown, "AOP—Remoting," Oct. 1, 2012, 6 pages, retrieved from retrieved from https://www.cnblogs.com/slayercat/archive/2012/10/03/27110973.html.
(Continued)

*Primary Examiner* — Oleg Korsak
(74) *Attorney, Agent, or Firm* — Quarles & Brady LLP

(57) ABSTRACT

Systems and techniques are described for monitoring network communications using a distributed firewall. One of the techniques includes receiving, at a driver executing in a guest operating system of a virtual machine, a request to open a network connection from a process associated with a user, wherein the driver performs operations comprising: obtaining identity information for the user; providing the identity information and data identifying the network connection to an identity module external to the driver; and receiving, by a distributed firewall, data associating the identity information with the data identifying the network connection from the identity module, wherein the distributed firewall performs operations comprising: receiving an outgoing packet from the virtual machine; determining that the identity information corresponds to the outgoing packet; and evaluating one or more routing rules based at least in part on the identity information.

18 Claims, 5 Drawing Sheets

Related U.S. Application Data continuation of application No. 16/041,698, filed on Jul. 20, 2018, now Pat. No. 10,798,058, which is a continuation of application No. 14/043,714, filed on Oct. 1, 2013, now Pat. No. 10,033,693.

(56) References Cited

U.S. PATENT DOCUMENTS

| | | |
|---|---|---|
| 6,363,477 B1 | 3/2002 | Fletcher et al. |
| 6,430,188 B1 | 8/2002 | Kadambi et al. |
| 6,496,935 B1 | 12/2002 | Fink et al. |
| 6,781,990 B1 | 8/2004 | Puri et al. |
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,418,249 B1 | 4/2013 | Nucci et al. |
| 8,484,739 B1 | 7/2013 | Seshadri |
| 8,621,556 B1 | 12/2013 | Bharali et al. |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1 | 4/2015 | Yarykin et al. |
| 9,015,823 B2 | 4/2015 | Koponen et al. |
| 9,059,999 B2 | 6/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,661,009 B1 | 5/2017 | Karandikar et al. |
| 9,762,619 B1 | 9/2017 | Vaidya et al. |
| 9,891,940 B2 | 2/2018 | Feroz et al. |
| 9,893,964 B2 | 2/2018 | Mai et al. |
| 9,912,699 B1 | 3/2018 | Hebbar et al. |
| 9,948,611 B2 | 4/2018 | Kumar et al. |
| 9,996,697 B2 | 6/2018 | Mahaffey et al. |
| 9,998,955 B1 | 6/2018 | MacCarthaigh |
| 10,033,693 B2 * | 7/2018 | Sengupta ............ H04L 67/63 |
| 10,228,959 B1 | 3/2019 | Anderson et al. |
| 10,324,746 B2 | 6/2019 | Kumar et al. |
| 10,333,983 B2 | 6/2019 | Vaidya et al. |
| 10,503,536 B2 | 12/2019 | Gunda |
| 10,581,960 B2 | 3/2020 | Gunda et al. |
| 10,606,626 B2 | 3/2020 | Feroz et al. |
| 10,609,160 B2 | 3/2020 | Poon et al. |
| 10,715,607 B2 | 7/2020 | Poon et al. |
| 10,778,651 B2 | 9/2020 | Gunda et al. |
| 10,798,058 B2 * | 10/2020 | Sengupta ............ H04L 67/63 |
| 10,802,857 B2 | 10/2020 | Gunda et al. |
| 10,802,858 B2 | 10/2020 | Gunda |
| 10,802,893 B2 | 10/2020 | Chanda et al. |
| 10,803,173 B2 | 10/2020 | Gunda et al. |
| 10,805,332 B2 | 10/2020 | Gunda et al. |
| 10,812,451 B2 | 10/2020 | Gunda et al. |
| 10,862,773 B2 | 12/2020 | Chanda et al. |
| 10,938,837 B2 | 3/2021 | Kumar et al. |
| 11,032,246 B2 | 6/2021 | Gunda et al. |
| 11,108,728 B1 | 8/2021 | Boutros et al. |
| 11,281,485 B2 | 3/2022 | Kumar et al. |
| 11,327,784 B2 | 5/2022 | Gunda et al. |
| 11,539,659 B2 | 12/2022 | Boutros et al. |
| 11,539,718 B2 | 12/2022 | Jain et al. |
| 11,695,731 B2 * | 7/2023 | Sengupta ............ H04L 63/0218 726/11 |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0027871 A1 | 2/2005 | Bradley et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2006/0109852 A1 | 5/2006 | Hadjiahmad et al. |
| 2006/0184646 A1 | 8/2006 | Schmidt et al. |
| 2007/0061492 A1 | 3/2007 | Riel |
| 2007/0101432 A1 | 5/2007 | Carpenter |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0270618 A1 | 10/2008 | Rosenberg |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0158432 A1 | 6/2009 | Zheng et al. |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1 | 10/2009 | McGee et al. |
| 2009/0265414 A1 | 10/2009 | Bryan |
| 2009/0281996 A1 | 11/2009 | Liu et al. |
| 2009/0288167 A1 | 11/2009 | Freericks et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2010/0251363 A1 | 9/2010 | Todorovic |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0126196 A1 | 5/2011 | Cheung et al. |
| 2011/0208960 A1 | 8/2011 | Flood |
| 2011/0225624 A1 | 9/2011 | Sawhney et al. |
| 2011/0238581 A1 | 9/2011 | Severson et al. |
| 2011/0246637 A1 | 10/2011 | Murakami |
| 2012/0124126 A1 | 5/2012 | Alcazar et al. |
| 2012/0158626 A1 | 6/2012 | Zhu et al. |
| 2012/0207174 A1 | 8/2012 | Shieh |
| 2012/0210423 A1 | 8/2012 | Friedrichs et al. |
| 2012/0222114 A1 | 8/2012 | Shanbhogue |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |

(56) References Cited

U.S. PATENT DOCUMENTS

| | | |
|---|---|---|
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2013/0339516 A1 | 12/2013 | Chauhan et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0143863 A1 | 5/2014 | Deb et al. |
| 2014/0155043 A1 | 6/2014 | Gell et al. |
| 2014/0173624 A1 | 6/2014 | Kurabayashi |
| 2014/0181889 A1 | 6/2014 | Black |
| 2014/0195666 A1 | 7/2014 | Dumitriu et al. |
| 2014/0215226 A1 | 7/2014 | Litty et al. |
| 2014/0226820 A1 | 8/2014 | Chopra et al. |
| 2014/0230008 A1 | 8/2014 | Feroz et al. |
| 2014/0233385 A1 | 8/2014 | Beliveau et al. |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2014/0344835 A1 | 11/2014 | Guo et al. |
| 2014/0355436 A1 | 12/2014 | Zhang et al. |
| 2014/0362682 A1 | 12/2014 | Guichard et al. |
| 2015/0009995 A1 | 1/2015 | Gross, IV et al. |
| 2015/0012964 A1 | 1/2015 | Xie et al. |
| 2015/0067818 A1 | 3/2015 | Molander et al. |
| 2015/0082301 A1 | 3/2015 | Garg et al. |
| 2015/0096007 A1 | 4/2015 | Sengupta et al. |
| 2015/0106438 A1 | 4/2015 | Fan et al. |
| 2015/0121061 A1 | 4/2015 | Goyal et al. |
| 2015/0134822 A1 | 5/2015 | Bhagwat et al. |
| 2015/0154293 A1 | 6/2015 | Lu |
| 2015/0163117 A1 | 6/2015 | Lambeth et al. |
| 2015/0169345 A1 | 6/2015 | DeCusatis et al. |
| 2015/0172208 A1 | 6/2015 | DeCusatis et al. |
| 2015/0229656 A1 | 8/2015 | Shieh |
| 2015/0269383 A1 | 9/2015 | Lang et al. |
| 2015/0281073 A1 | 10/2015 | Kotha et al. |
| 2015/0350807 A1 | 12/2015 | Andrews et al. |
| 2015/0358231 A1 | 12/2015 | Zhang et al. |
| 2015/0358344 A1 | 12/2015 | Mumcuoglu et al. |
| 2015/0379279 A1 | 12/2015 | Feroz et al. |
| 2015/0381578 A1 | 12/2015 | Thota et al. |
| 2016/0057014 A1 | 2/2016 | Thakkar et al. |
| 2016/0057167 A1 | 2/2016 | Bach |
| 2016/0065456 A1 | 3/2016 | Muley et al. |
| 2016/0072669 A1 | 3/2016 | Saavedra |
| 2016/0087905 A1 | 3/2016 | Liu et al. |
| 2016/0119194 A1 | 4/2016 | Lopez et al. |
| 2016/0134634 A1 | 5/2016 | Rosendal et al. |
| 2016/0142287 A1 | 5/2016 | Yang et al. |
| 2016/0173329 A1 | 6/2016 | Latham et al. |
| 2016/0191413 A1 | 6/2016 | Feroz et al. |
| 2016/0191521 A1 | 6/2016 | Feroz et al. |
| 2016/0212167 A1 | 7/2016 | Dotan et al. |
| 2016/0224789 A1 | 8/2016 | Feroz et al. |
| 2016/0226700 A1 | 8/2016 | Zhang et al. |
| 2016/0232024 A1 | 8/2016 | Hamilton et al. |
| 2016/0234250 A1 | 8/2016 | Ashley et al. |
| 2016/0241389 A1 | 8/2016 | Saint et al. |
| 2016/0294923 A1 | 10/2016 | Fan et al. |
| 2016/0315864 A1 | 10/2016 | Tan et al. |
| 2016/0330138 A1 | 11/2016 | Thomason |
| 2016/0337236 A1 | 11/2016 | Hsu et al. |
| 2016/0359658 A1 | 12/2016 | Yadav et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1 | 4/2017 | Raney |
| 2017/0099228 A1 | 4/2017 | Hunsperger et al. |
| 2017/0118241 A1 | 4/2017 | Call et al. |
| 2017/0126677 A1 | 5/2017 | Kumar et al. |
| 2017/0170990 A1 | 6/2017 | Gaddehosur et al. |
| 2017/0171143 A1 | 6/2017 | Ge et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063160 A1 | 3/2018 | Kumar |
| 2018/0063194 A1 | 3/2018 | Vaidya et al. |
| 2018/0103011 A1 | 4/2018 | Li et al. |
| 2018/0159733 A1 | 6/2018 | Poon et al. |
| 2018/0159943 A1 | 6/2018 | Poon et al. |
| 2018/0181423 A1 | 6/2018 | Gunda et al. |
| 2018/0181754 A1 | 6/2018 | Gunda |
| 2018/0181763 A1 | 6/2018 | Gunda |
| 2018/0183759 A1 | 6/2018 | Gunda et al. |
| 2018/0183761 A1 | 6/2018 | Gunda et al. |
| 2018/0183764 A1 | 6/2018 | Gunda |
| 2018/0183866 A1 | 6/2018 | Gunda et al. |
| 2018/0191763 A1 | 7/2018 | Hillard et al. |
| 2018/0212788 A1 | 7/2018 | Iszlai et al. |
| 2018/0212818 A1 | 7/2018 | Ide et al. |
| 2018/0241761 A1 | 8/2018 | Bania et al. |
| 2018/0331948 A1 | 11/2018 | Jiang et al. |
| 2018/0351912 A1 | 12/2018 | Sengupta et al. |
| 2019/0034454 A1 | 1/2019 | Gangumalla et al. |
| 2019/0036956 A1 | 1/2019 | Gunda et al. |
| 2019/0075052 A1 | 3/2019 | Chirreddy et al. |
| 2019/0149525 A1 | 5/2019 | Gunda et al. |
| 2019/0235934 A1 | 8/2019 | Chanda et al. |
| 2019/0238429 A1 | 8/2019 | Chanda et al. |
| 2019/0266004 A1 | 8/2019 | Kumar et al. |
| 2019/0394302 A1 | 12/2019 | Kristiansson et al. |
| 2020/0014662 A1 | 1/2020 | Chanda et al. |
| 2020/0036608 A1 | 1/2020 | Chanda et al. |
| 2020/0225978 A1 | 7/2020 | Feroz et al. |
| 2020/0364074 A1 | 11/2020 | Gunda et al. |
| 2021/0036990 A1 | 2/2021 | Sengupta et al. |
| 2021/0081461 A1 | 3/2021 | Zhou et al. |
| 2021/0218758 A1 | 7/2021 | Jain et al. |
| 2022/0029950 A1 | 1/2022 | Boutros et al. |
| 2022/0261273 A1 | 8/2022 | Gunda et al. |
| 2023/0018434 A1 | 1/2023 | Mandliwala et al. |
| 2023/0131464 A1 | 4/2023 | Jain et al. |

FOREIGN PATENT DOCUMENTS

| | | |
|---|---|---|
| CN | 103001923 A | 3/2013 |
| CN | 103890751 A | 6/2014 |
| CN | 104364761 A | 2/2015 |
| CN | 105229968 A | 1/2016 |
| CN | 105324957 A | 2/2016 |
| CN | 105378659 A | 3/2016 |
| CN | 105630512 A | 6/2016 |
| EP | 2748750 A1 | 7/2014 |
| JP | 2016514295 A | 5/2016 |
| JP | 2016524248 A | 8/2016 |
| WO | 2004019232 A2 | 3/2004 |
| WO | 2008095010 A1 | 8/2008 |
| WO | 2013074828 A1 | 5/2013 |
| WO | 2014126574 A1 | 8/2014 |
| WO | 2014168936 A1 | 10/2014 |
| WO | 2014198567 A1 | 12/2014 |
| WO | 2016161799 A1 | 10/2016 |
| WO | 2018044352 A1 | 3/2018 |

(56) References Cited

FOREIGN PATENT DOCUMENTS

| WO | 2018106612 A1 | 6/2018 |
|---|---|---|
| WO | 2018118465 A1 | 6/2018 |

OTHER PUBLICATIONS

Author Unknown, "Cisco Identity-Based Firewall Security," Month Unknown 2011, 2 pages, Cisco Systems, Inc.
Author Unknown, "Middlebox," Oct. 19, 2016, 4 pages, retrieved from https://www.cnblogs.com/sddai/p/5978755.html.
Author Unknown, "Enabling Service Chaining on Cisco Nexus 1000V Series," Month Unknown, 2012, 25 pages, Cisco.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Brownlee, N., et al., "Traffic Flow Measurement: Architecture," RFC 2722, Oct. 1999, 48 pages, The Internet Society.
Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Flegkas, Paris, et al., "On Policy-Based Extensible Hierarchical Network Management in QoS-Enabled IP Networks," Policy '01 Proceedings of the International Workshop on Policies for Distributed Systems and Networks, Jan. 29-31, 2011, 17 pages, Springer-Verlag, London, UK.
Guichard, J., et al., "Network Service Chaining Problem Statement," Network Working Group, Jun. 13, 2013, 14 pages, Cisco Systems, Inc.
Ioannidis, Sotiris, et al., "Implementing a Distributed Firewall," CCS '00, Month Unknown 2000, 10 pages, ACM, Athens, Greece.
Johnson, Maritza L., et al., "Laissez-faire File Sharing: Access Control Designed for Individuals at the Endpoints," NSPW '09: Proceedings of the 2009 Workshop on New Security Paradigms Workshop, Sep. 8-11, 2009, 9 pages, ACM, Oxford, United Kingdom.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Mao, Jian-Biao, et al., "Software-Defined DCN Control Framework Supporting Efficient Network Management," Journal of Beijing University of Posts and Telecommunications, Oct. 2015, 5 pages, vol. 38, No. 5, retrieved from https://journal.bupt.edu.cn/EN/10.13190/j.jbupt.2015.05.021.
Moshref, Masoud, et al., "vCRIB: Virtualized Rule Management in the Cloud," HotCloud'12, Jun. 12-13, 2012, 6 pages.
Nance, Kara, et al., "Virtual Machine Introspection: Observation or Interference?," IEEE Security and Privacy, Sep. 1, 2008, 6 pages, vol. 6, No. 5, IEEE Service Center, Los Alamitos, CA, US.
Rubino, Roberto D., "An Open System for Transparent Firewall Authentication and User Traffic Identification within Corporate Intranets," SIGITE '08, Oct. 16-18, 2008, 5 pages, ACM, Cincinnati, Oh, USA.
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Schulz-Zander, Julius, et al., "Realizing Software-Defined Wireless Networks: Acheiving Fine-Grained Wi-Fi Programmability with Off-the-Shelf Hardware," Apr. 20, 2016, 126 pages.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture Of A Identity Based Firewall System," Jul. 2011, 9 pages.
Fang, Bing-Wu, et al., "Web—Research and Implementation of Transaction Model for Web Services Composition," Jun. 25, 2010, 4 pages, China Academic Journal Electronic Publishing House.
Anderson, Blake, et al., "Identifying Encrypted Malware Traffic with Contextual Flow Data," AISec' 16, Oct. 28, 2016, 12 pages, ACM, Vienna, Austria.
Frece, Ales, et al., "Modeling Functional Requirements for Configurable Content- and Context-aware Dynamic Service Selection in Business Process Models," Journal of Visual Languages and Computing, Apr. 27, 2012, 25 pages, vol. 23, Elsevier Ltd.

\* cited by examiner

DISTRIBUTED IDENTITY-BASED FIREWALLS

CLAIM OF BENEFIT TO PRIOR APPLICATIONS

This application is a continuation application of U.S. patent application Ser. No. 17/063,415, filed Oct. 5, 2020, now published as U.S. Patent Publication 2021/0036990. U.S. patent application Ser. No. 17/063,415 is a continuation application of U.S. patent application Ser. No. 16/041,698, filed Jul. 20, 2018, now issued as U.S. Pat. No. 10,798,058. U.S. patent application Ser. No. 16/041,698, is a continuation application of U.S. patent application Ser. No. 14/043,714, filed Oct. 1, 2013, now issued as U.S. U.S. Pat. No. 10,033,693. U.S. patent application Ser. No. 17/063,415, now published as U.S. Patent Publication 2021/0036990, U.S. patent application Ser. No. 16/041,698, now issued as U.S. Pat. No. 10,798,058, and U.S. patent application Ser. No. 14/043,714, now issued as U.S. Pat. No. 10,033,693 are incorporated herein by reference.

BACKGROUND

This document relates to monitoring virtual machine network communications.

A virtual machine is a software-based abstraction of a physical computer system. In general, a computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine or physical machine, can execute one or more virtual machines.

SUMMARY

In general, one aspect of the subject matter described in this document can be embodied in a technique that includes receiving, at a driver executing in a guest operating system of a virtual machine, a request to open a network connection from a process associated with a user, wherein the driver performs operations comprising: obtaining identity information for the user; providing the identity information and data identifying the network connection to an identity module external to the driver; and receiving, by a distributed firewall, data associating the identity information with the data identifying the network connection from the identity module, wherein the distributed firewall performs operations comprising: receiving an outgoing packet from the virtual machine; determining that the identity information corresponds to the outgoing packet based on a comparison between source information for the outgoing packet and the data received from the identity module; and evaluating one or more routing rules based at least in part on the identity information. Other embodiments of this aspect include corresponding systems, apparatus, and computer software encoded on a non-transitory machine readable storage medium.

These and other aspects can optionally include one or more of the following features. The operations performed by the distributed firewall can further include: forwarding the outgoing packet when approved according to the routing rules. The operations performed by the distributed firewall can further include: blocking the packet when denied according to the routing rules.

The distributed firewall can be implemented in a hypervisor that is configured to monitor the virtual machine. The identity information can be a security identifier (SID) for the user. Evaluating the one or more routing rules can further include: evaluating the one or more routing rules based in part on one or more of a source Internet Protocol (IP) address for the outgoing packet, a source port number for the outgoing packet, an intended destination IP address for the outgoing packet, or an intended destination port number for the outgoing packet.

The technique can further include receiving, by the identity module, the identity information and the data identifying the network connection; generating, by the identity module, data associating the identity information with the data identifying the network connection; and providing, by the identity module, the data associating the identity information with the data identifying the network connection to the distributed firewall. The data identifying the network connection can include an Internet Protocol (IP) address and one or more port numbers assigned to the network connection.

In general, another aspect of the subject matter described in this document can be embodied in a technique that includes receiving, at a driver executing in a guest operating system of a virtual machine, a request to open a network connection from a process associated with a user, wherein the driver performs operations comprising: obtaining identity information for the user; receiving an outgoing packet from the process over the network connection; adding the identity information for the user to the outgoing packet to generate a second packet; and providing the second packet to a first system external to the network driver; and receiving, by the first system, the second packet from the driver, wherein the first system performs operations comprising: evaluating one or more routing rules based at least in part on the identity information of the second packet. Other embodiments of this aspect include corresponding systems, apparatus, and computer software encoded on a non-transitory machine readable storage medium.

These and other aspects can optionally include one or more of the following features. The operations performed by the first system can further include: forwarding the second packet when approved according to the routing rules, wherein the forwarded second packet does not include the identity information. The operations performed by the first system can further include: blocking the second packet when denied according to the routing rules. The first system can be implemented in a hypervisor that is configured to monitor the virtual machine.

Forwarding the second packet can include: modifying the second packet by removing the identity information from the second packet; and forwarding the modified second packet to a virtual switch implemented in the hypervisor for transmission to an intended recipient of the outgoing packet. The identity information can be a security identifier (SID) for the user. Evaluating the one or more routing rules can further include: evaluating the one or more routing rules based in part on one or more of a source internet protocol (IP) address for the second packet, a source port number for the second packet, an intended destination IP address for the second packet, or an intended destination port number for the second packet.

Particular embodiments of the subject matter described in this document can be implemented so as to realize one or more of the following advantages. Accurate identity information or users of virtual machines can be provided to a firewall for use in implementing identity-based routing rules. Identity-based routing rules can be effectively used with low latency and without limiting performance of the virtual machine or the physical machine hosting the virtual machine. By executing a respective identity-based firewall module for each virtual machine in the hypervisor of the physical machine hosting the virtual machine, identity-based routing rules can be effectively implemented in a distributed and scalable manner. Identity-based routing rules can be accurately applied to communications received from multi-user virtual machines, e.g., from Virtual Desktop Infrastructure (VDI) virtual machines that experience frequent log ins and log outs from multiple users or from terminal servers having multiple users logged in at the same time.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes techniques for implementing a hypervisor-based firewall that can apply routing rules to outgoing communications from virtual machines. The routing rules are based at least in part on the identity of the user associated with the process initiating the outgoing communication.

Figure 1A:
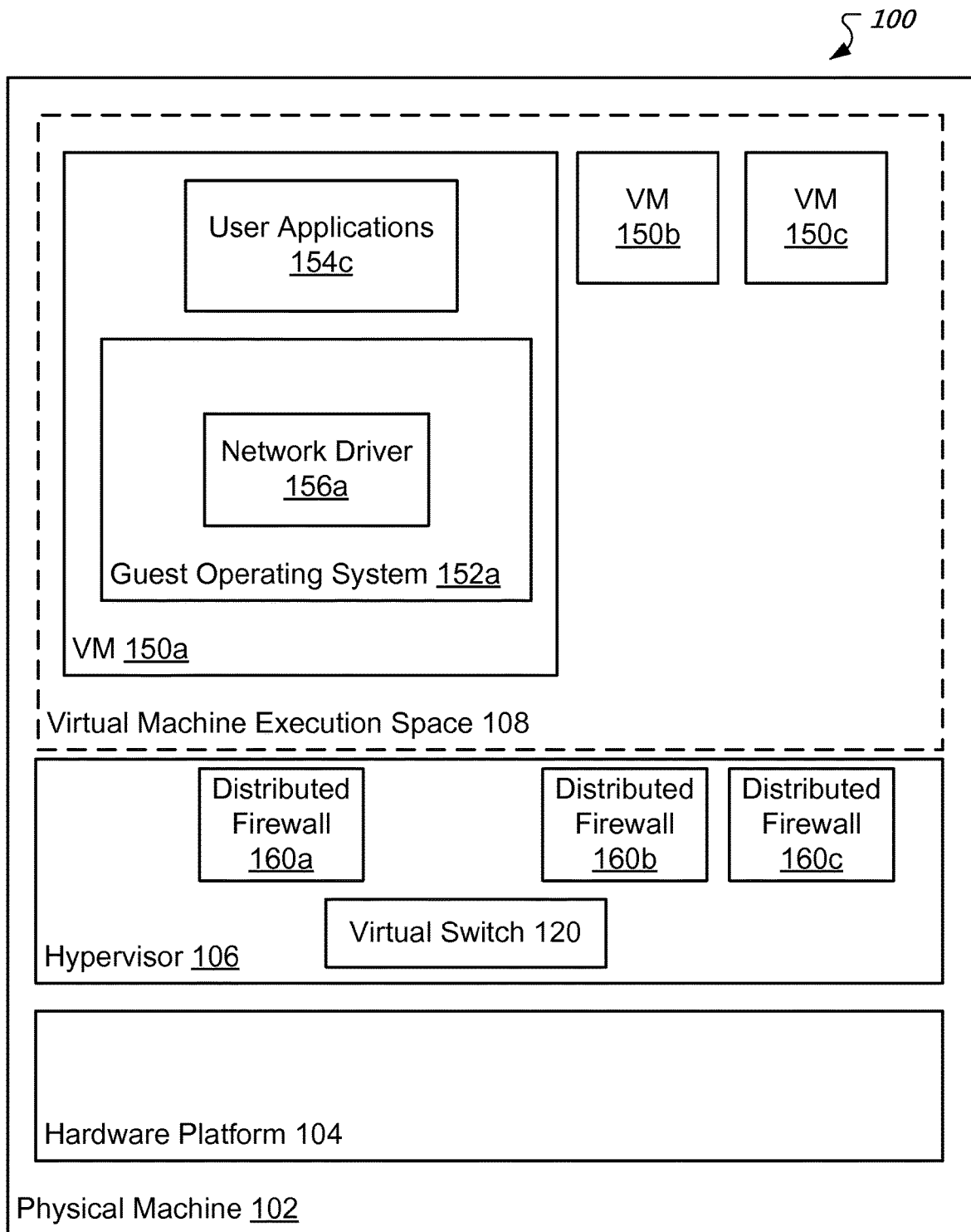
FIG. 1A shows an architecture for an example system that is configured to monitor virtual machine network traffic using a distributed firewall.

FIG. 1A shows an architecture for an example system 100 that is configured to monitor virtual machine (VM) network communications using a distributed firewall. In the system 100, a physical machine 102 is configured to execute VMs 150a through 150c using a hypervisor 106. The physical machine 102 is one or more data processing apparatus that each includes a hardware platform 104. The hardware platform 104 may include, e.g., a local storage device, a network adapter, memory, a processor, and so on.

The hypervisor 106 is a virtualization software layer that executes on the hardware platform 104. The hypervisor 106 manages a virtual machine execution space 108 within which one or more VMs, e.g., VMs 150a-150c, may be concurrently instantiated and executed. For each of the VMs 150a-150c, the hypervisor 106 manages a corresponding virtual hardware platform. Each virtual hardware platform includes emulated hardware, e.g., a virtual storage device, a virtual network adapter/interface, virtual memory, a virtual processor, and so on.

Each virtual machine managed by the hypervisor 106 executes a guest operating system, e.g., guest operating system 152a, that executes user applications, e.g., user applications 154c. The hypervisor 106 transforms input/output (I/O) requests from the guest operating systems to the corresponding virtual hardware platform into corresponding requests to the hardware platform 104.

The hypervisor 106 includes a respective distributed firewall module, e.g., distributed firewall modules 160a-160c, for each virtual machine managed by the hypervisor 106. Each distributed firewall module receives outgoing communications, e.g., packets intended for transmission to other virtual machines executing on the physical machine 102 or for transmission to a different physical machine over a network, sent by the corresponding virtual machine and determines whether to allow, block, redirect or take some other action with respect to each communication in accordance with a respective set of routing rules. While FIG. 1 shows a respective distributed firewall module for each virtual machine managed by the hypervisor, in some implementations, one or more of the distributed firewall modules 160c-160c can be assigned to manage communications for multiple virtual machines managed by the hypervisor 106.

Advantageously, the routing rules can include identity-based rules, i.e., rules that determine what action should be taken with respect to a communication based in part on the identity or the group membership of the user that is sending the communication. Example identity-based routing rules will be described in more detail below with reference to FIG. 2. Once a distributed firewall module, e.g., one of the distributed firewall modules 160a-160c, has determined to allow a communication to be transmitted, the distributed firewall module forwards the communication to a virtual switch 120 in the hypervisor 106 for distribution to the determined destination, e.g., using a network adaptor in the hardware platform 104 of the physical machine 102. The virtual switch 120 is an emulated hardware switch that executes in the hypervisor 120 and routes network communications between VMs executing on the physical machine 102 or to and from external data processing apparatus using the network adaptor in the hardware platform 104. The identity-based rules can optionally also be applied to incoming communications, i.e., the distributed firewall modules can determine what action should be taken with respect to a communication received from the virtual switch 120 and intended for one of the VMs 150a-150c based in part on the identity or the group membership of the user that is the intended recipient of the communication.

In order to provide the distributed firewall module 160a with identity information for any given outgoing communication sent by, e.g., one of the user applications 154c of the VM 150a, a network driver 156a executes in the guest operating system 152a of VM 150a. The network driver 156a is a protocol stack that implements a computer networking protocol suite such as, for example, Transmission Control Protocol/Internet Protocol (TCP/IP). In some implementations, the network driver 156a implements the Transport Driver Interface (TDI). Other protocol suites are possible. The protocol stack comprises modules or layers that each implement a portion of the protocol suite and can communicate with each other. In some implementations, the network driver implements some or all of the Open Systems Interconnection (OSI) model layers. In some implementations, the network driver 156a executes entirely or partially in the kernel space of the guest OS 152a. In other implementations, the network driver 156a executes in the user space of the guest OS 152a. Kernel space is a protected memory area generally reserved for running the guest OS 152a kernel, kernel extensions, and device drivers. User space is a memory area where user mode applications execute. In some implementations, the network driver 156a communicates with the hypervisor 106 through a network adaptor or interface in the emulated hardware.

The network driver 156a detects network events. In some implementations, the network driver 156a can also deny or modify outgoing packets before they are transmitted to the distributed firewall module 160a. When a request is received from one of the user applications 154c or from another process executing on the VM 150a to open a network connection, the network driver 156a obtains identity information for the user associated with the process. The identity information is used by the distributed firewall module 160a to determine what action to take with respect to each packet that is transmitted over the network connection. For example, the identity information may be a Security Identifier (SID) or other identifier of a user currently logged in to the virtual machine, e.g., a username of the user or group membership information for the user.

In some implementations, the network driver 156a adds the obtained identity information into an outgoing packet and transmits the outgoing packet to the distributed firewall module 160a. An example technique for processing packets that are transmitted over a network connection using identity information that has been added to an outgoing packet is described below with reference to FIG. 3. In some other implementations, the network driver 156a transmits the obtained identity information to an identity module.

Figure 1B:
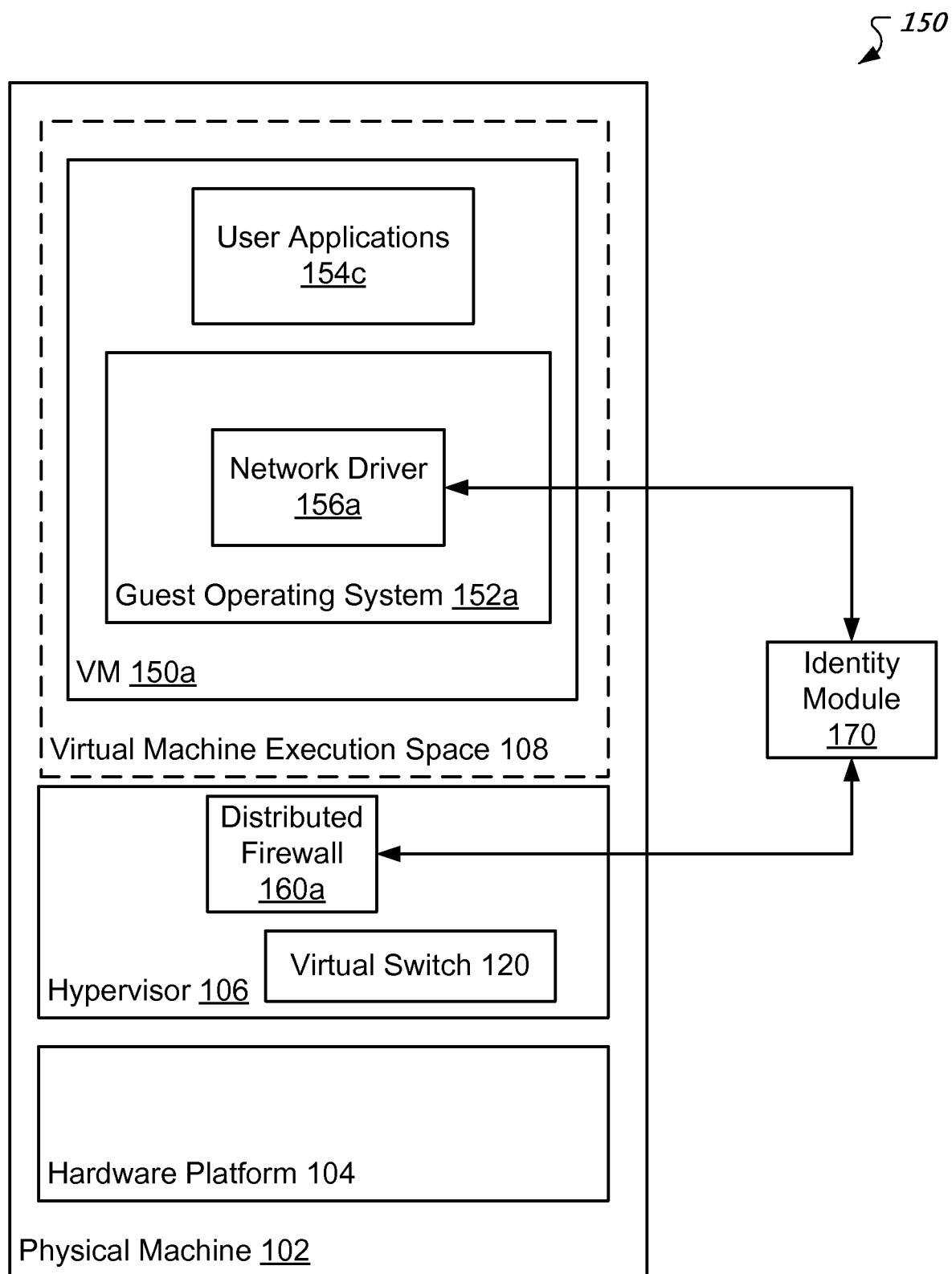
FIG. 1B shows an architecture for an example system that is configured to provide identity information to a distributed firewall using an identity module.

FIG. 1B shows an architecture for an example system 150 that is configured to provide identity information to a distributed firewall using an identity module. In the system 150, the network driver 156a and the distributed firewall module 160a can communicate with an identity module 170. The identity module 170 can be executed by the physical machine 104 as part of the hypervisor 106 or the VM execution space 108. Alternatively, the identity module 170 can execute on an external data processing apparatus, i.e., on a separate physical machine from the network driver 156a and the distributed firewall module 160a.

The identity module 170 receives identity information and network connection information from the network driver 156a and provides data associating the network connection with the identity information to the distributed firewall 160a for use in determining what action to take with respect to packets that are transmitted over the network connection. An example technique for processing packets that are transmitted over a network connection using identity information received from an identity module is described below with reference to FIG. 4.

Figure 2:
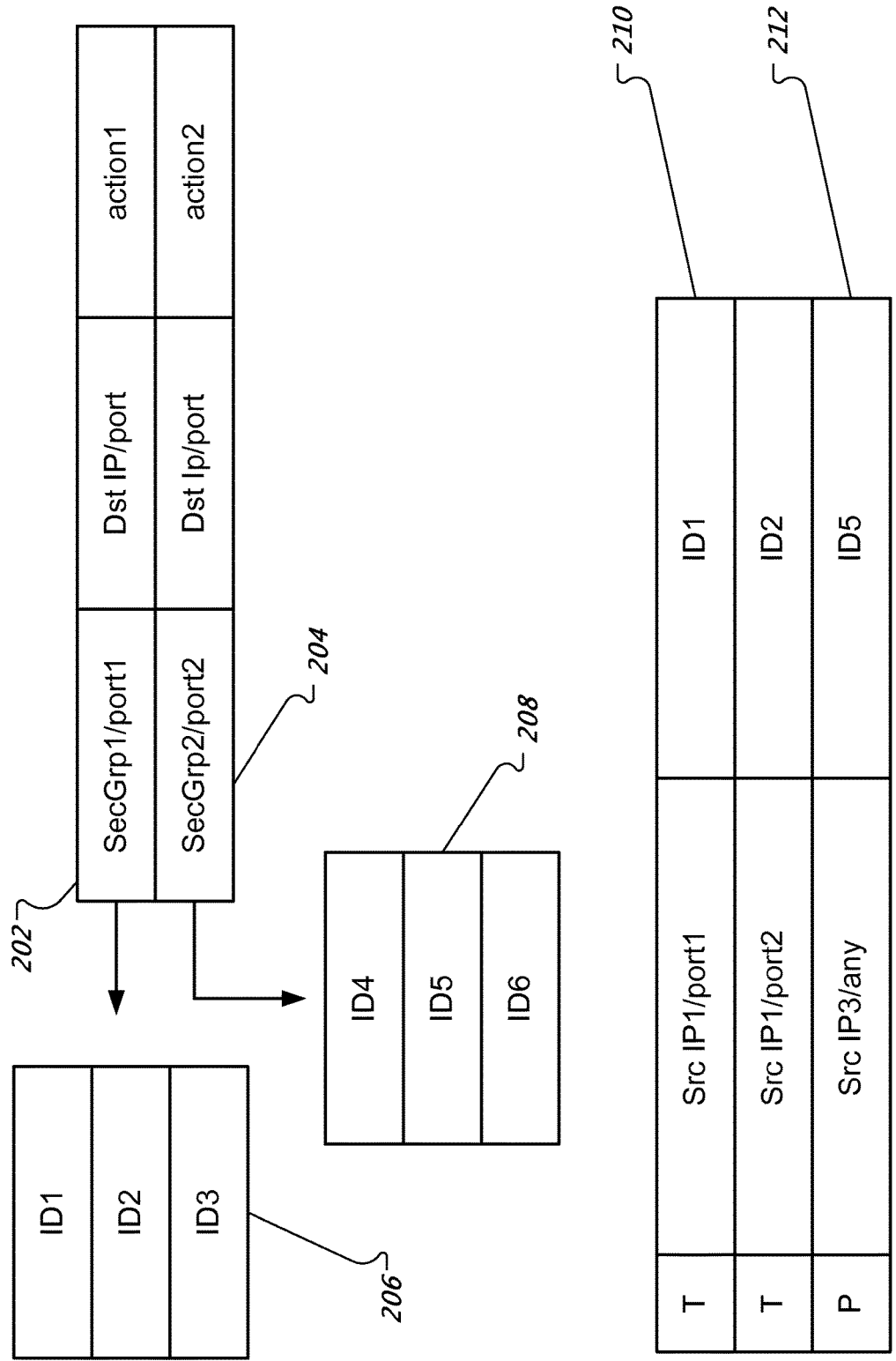
FIG. 2 shows example identity-based routing rules.

FIG. 2 shows example identity-based routing rules. The identity-based routing rules can be used by a distributed firewall module, e.g., one of the distributed firewall modules 160a of FIG. 1, to determine an appropriate action in response to receiving an outgoing packet from a VM. Each identity-based routing rule specifies criteria for an outgoing packet and an action to be taken when the outgoing packet satisfies the criteria. For example, identity-based routing rule 202 specifies originating criteria, i.e., that the outgoing packet must originate from a user in a security group "SecGrp1" and from a port "port1," destination criteria, i.e., that the outgoing packet must be intended for a destination IP address "Dst IP" and a destination port "port," and an action "action1" to be taken by the distributed firewall module when the outgoing packet satisfies the criteria. The action may be, e.g., to allow the packet to proceed to the intended destination, to re-direct the packet to a different destination, to block the packet from being transmitted, and so on. Other types of routing rules with or without qualifiers, e.g., log, copy, and so on, are possible.

As another example, identity-based routing rule 204 specifies that, for a packet originating from a user in a user group "SecGrp2" and from a port "port2," and intended for the same destination IP address "Dst IP" and destination port "port," a different action "action2" should be taken by the distributed firewall module. While rules 202 and 204 are examples of identity-based rules in which packet routing depends on the user group membership of a user sending the packet, other identity-based rules are possible in which packet routing is different for each different user, i.e., is based on a unique identifier of a user sending the packet. Additionally, while the rules 202 and 204 specify group-based routing criteria, the identity information received by the distributed firewall module may include a user identifier, e.g., a security identifier (SID) for the user. In these cases, the distributed firewall module may need to store data identifying the members of user groups included in routing rules. For example, the distributed firewall may store data 206 indicating that the members of the group "SecGrp1" are the users having identifiers "ID1," "ID2," and "ID3." As another example, the distributed firewall may store data 208 indicating that the members of the group "SecGrp2" are the users having identifiers "ID4," "ID5," and "ID6."

In some implementations, e.g., in implementations that make use of the technique described below with reference to FIG. 4, it may be necessary for the distributed firewall module to determine identity information from the sender information of an outgoing packet. That is, the distributed firewall module may obtain and store data that associates a source IP address and port number with a user identifier or user group identifier. For example, the distributed firewall may store data 210 that indicates that packets received from source IP address "Src IP1" and port "port1" are associated with a user identified by the identifier "ID1." As another example, data 212 identifies an association between a source IP address "Src IP3" and a user identified by the identifier "ID5." Each piece of association data may be stored with an indication of whether or not the association is temporary or permanent. A temporary association is an association that is only valid while a network connection is open and expires when the network connection is closed. A permanent association is an association that is valid independent of the network connection used to transmit the outgoing packet. For example, the data 210 identifies the association as temporary while the data 212 identifies the association as temporary.

Figure 3:
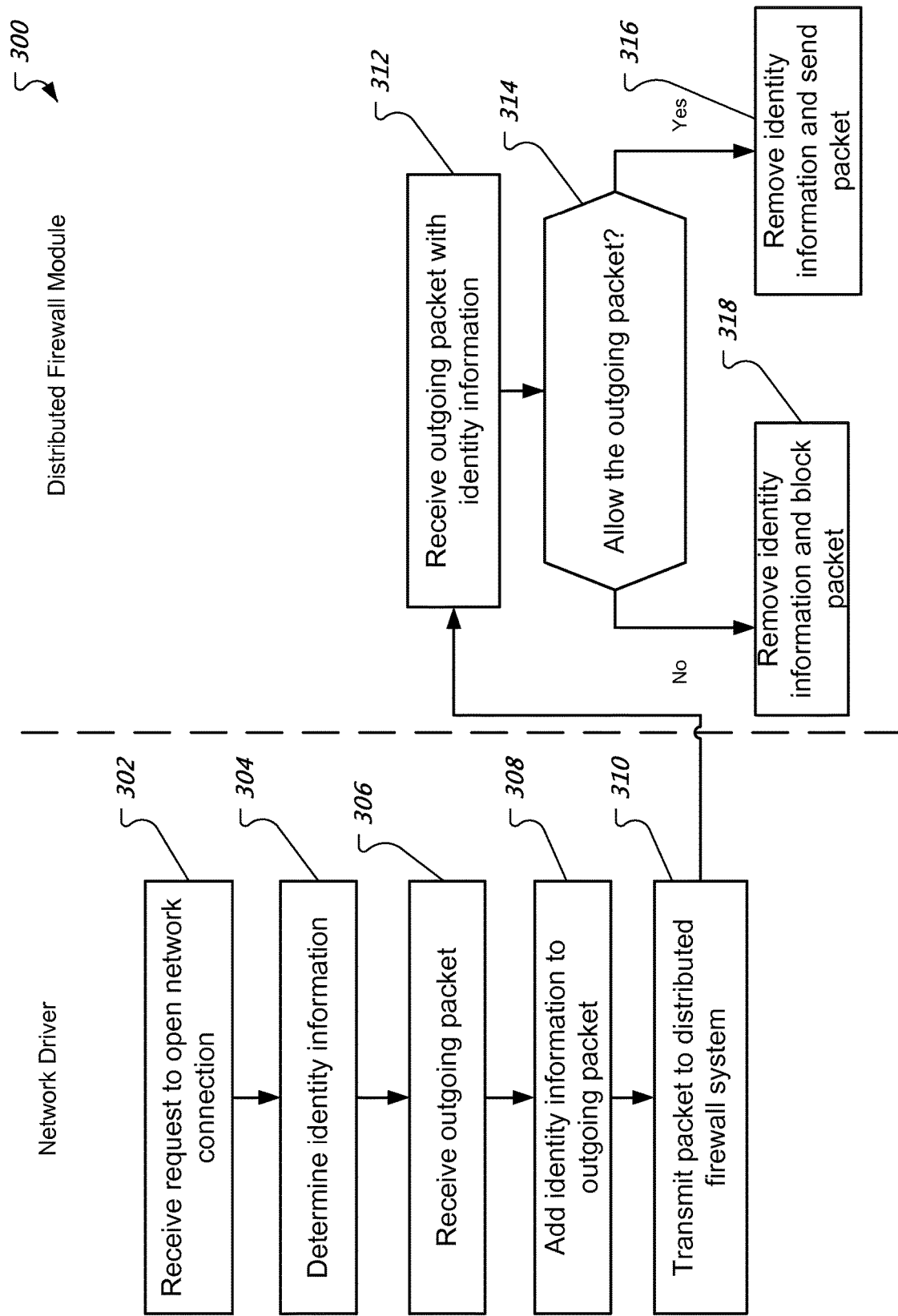
FIG. 3 is a flowchart of an example technique for processing an outgoing packet using a distributed identity-based firewall as implemented on one or more data processing apparatus.

FIG. 3 is a flowchart of an example technique 300 for processing an outgoing packet using a distributed identity-based firewall as implemented on one or more data processing apparatus.

At step 302, a network driver, e.g., the network driver 150a of FIG. 1, executing as part of a guest operating system of a VM, e.g., the guest operating system 152a of the VM 150a of FIG. 1, receives a request to open a network connection from a user process executing on the VM. For example, the process can be a user application, e.g., one of the user applications 154c of FIG. 1.

At step 304, the network driver determines identity information for a user associated with the process. For example, the network driver can determine the SID for the user currently logged into the VM. The system can obtain the identity information from the guest operating system by, e.g., submitting a request for the information to the operating system using an Application Programming Interface (API) provided by the guest operating system. While the identification information is being determined, the network driver blocks the requested network connection, i.e., prevents any packets from being transmitted using the connection.

At step 306, the network driver receives an outgoing packet to be transmitted over the network connection.

At step 308, the network driver adds the determined identity information to the outgoing packet. The network driver can use any of a variety of techniques to add the identity information to the packet. For example, a tunnel may be established between the network driver and a distributed firewall module for the VM, e.g., the distributed firewall module 160a of FIG. 1. The tunnel may be established using any of a variety of tunneling protocols, e.g., Generic Routing Encapsulation (GRE), NVGRE (Network Virtualization using Generic Routing Encapsulation), and so on. The network driver can then encapsulate the outgoing packet into a tunneling packet and insert the identity information into the header of the tunneling packet.

At step 310, the network driver transmits the packet to the distributed firewall module for the VM. For example, the system can transmit the tunneling packet that includes the encapsulated outgoing packet to the distributed firewall module in accordance with the tunneling protocol.

At step 312, the distributed firewall module receives the outgoing packet with the identity information. For example, the distributed firewall module may receive the tunneling packet and extract the outgoing packet and the identity information from the tunneling packet.

At step 314, the distributed firewall module determines whether to allow or block the outgoing packet. The distributed firewall module can make the decision by evaluating the identity information, other information about the source, e.g., the source IP address, port number, or both, and information about the destination of the intended destination of the packet, e.g., the destination IP address, port number, or both, against a set of identity-based rules as described above with reference to FIG. 2.

At step 316, if the packet is allowed, the distributed firewall module removes the identity information added by the network driver to the packet and forwards the packet to a virtual switch, e.g., the virtual switch 120 of FIG. 1, for transmission to the intended recipient. Alternatively, if the routing rule indicates that the packet should be redirected to a different destination, the distributed firewall module removes the identity information and forwards the packet to the virtual switch for transmission to the intended recipient.

At step 318, if the packet is blocked, the distributed firewall system removes the identity information added by the network driver to the packet but prevents the packet form being sent to the intended recipient.

In some implementations, once a network connection has been opened, the network driver continues using the determined identity information for the connection until the network connection is closed, i.e., until the network driver receives an indication from the VM that a disconnect for the network connection has occurred or until a timer associated with the connection expires. In some other implementations, if the network driver receives updated identity information that indicates a change in the identity information of the user associated with the process while a network connection is open, the network connection may close or drop the open network connection.

As described with reference to the technique 300, a network driver executing on the VM modifies each outgoing packet to include user identity information. However, in some circumstances, it may not be possible or advantageous for the driver or another process executing on the VM to modify outgoing packets.

Figure 4:
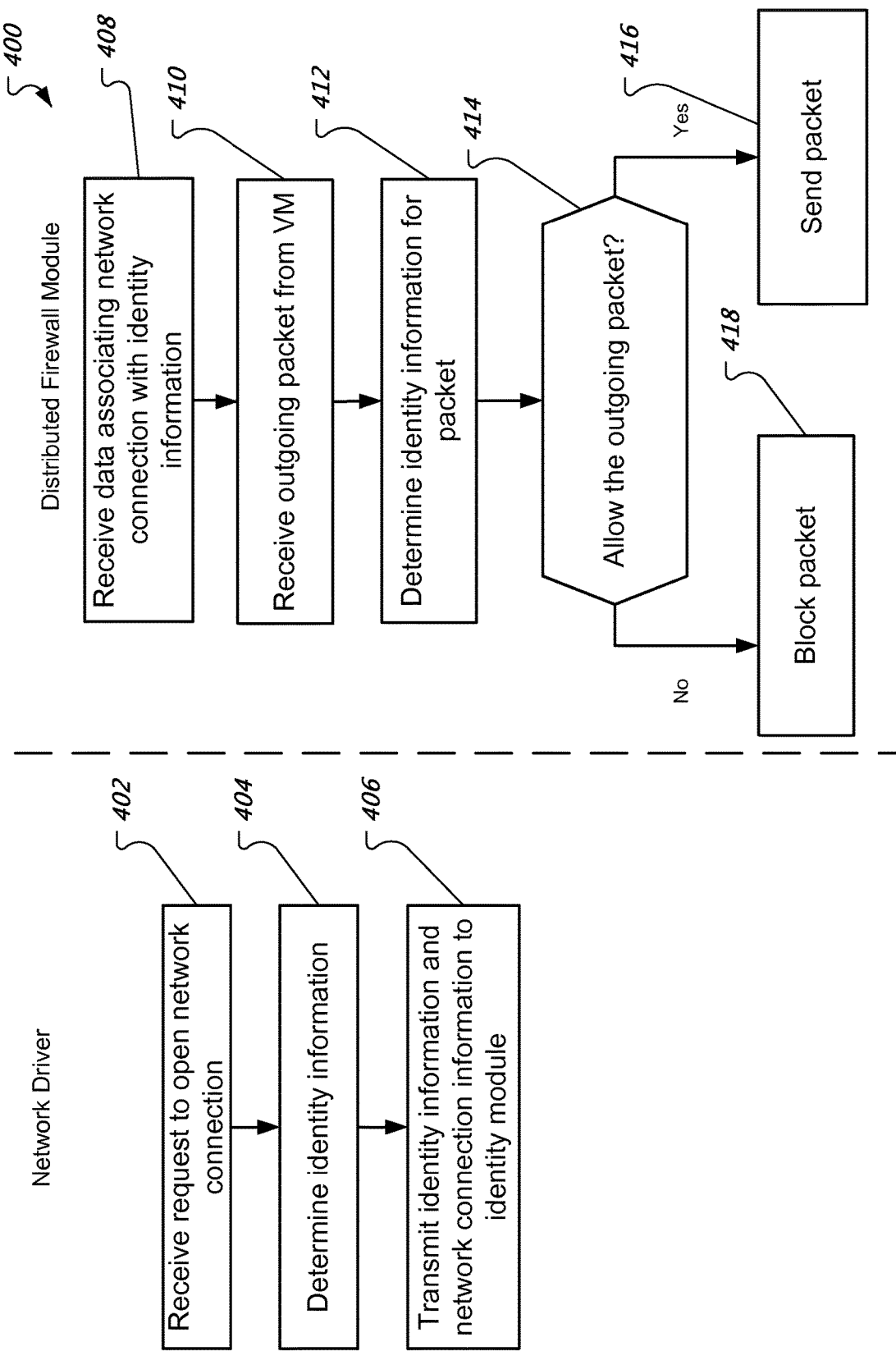
FIG. 4 is a flowchart of another example technique for processing an outgoing packet using a distributed identity-based firewall as implemented on one or more data processing apparatus.

FIG. 4 shows a flowchart for another example technique 400 for processing an outgoing packet using a distributed identity-based firewall as implemented on one or more data processing apparatus.

At step 402, a network driver, e.g., the network driver 150a of FIG. 1, executing as part of a guest operating system of a VM, e.g., the guest operating system 152a of the VM 150a of FIG. 1, receives a request to open a network connection from a user process executing on the VM. For example, the process can be a user application, e.g., one of the user applications 154c of FIG. 1.

At step 404, the network driver determines identity information for a user associated with the process. While the identification information is being determined, the network driver blocks the requested network connection, i.e., prevents any packets from being transmitted using the connection.

At step 406, the network driver transmits the determined identity information and information identifying the requested network connection to an identity module. The identity module can be, e.g., a process executing on the same physical machine as the VM, e.g., the physical machine 102, or on an external data processing apparatus. The information identifying the requested network connection can be, e.g., the IP address of the VM and the port or ports allocated to the network connection. The identity module is responsible for receiving requests from the network driver and transmitting data associating data identifying a network connection with data identifying the user of the process that establishes the network connection to a distributed firewall module corresponding to the VM, e.g., the distributed firewall module 160a of FIG. 1. For example, the data can associate a source VM and one or more port numbers with a SID. Additionally, the data transmitted by the identity module to the distributed firewall module can identify the transmitted data as temporary, i.e., only for use while the network connection is open. Temporary data can be used, e.g., until a timer associated with the data expires or until an indication is received from the VM that a disconnect for the network connection has occurred.

At step 408, the distributed firewall module receives the data associating the network connection with the identity information from the identity module. The distributed firewall module stores the received data with an indication of whether the received data is temporary or permanent.

At step 410, the distributed firewall module receives an outgoing packet from the VM.

At step 412, the distributed firewall module determines identity information for the packet. For example, the distributed firewall module can compare the source information for the packet, e.g., the source IP address and source port for the packet, to the data received from the identity module to identify a corresponding user identifier. That is, the distributed firewall module can determine which identity information corresponds to the outgoing packet by accessing data previously received from the identity module.

At step 414, the distributed firewall module determines whether to allow or block the outgoing packet. The distributed firewall module can make the decision by evaluating the identity information, other information about the source, e.g., the source IP address, port number, or both, and information about the destination of the intended destination of the packet, e.g., the destination IP address, port number, or both, against a set of identity-based rules as described above with reference to FIG. 2.

At step 416, if the packet is allowed, the distributed firewall module forwards the packet to a virtual switch, e.g., the virtual switch 120 of FIG. 1, for transmission to the intended recipient. Alternatively, if the routing rule indicates that the packet should be redirected to a different destination, the distributed firewall module forwards the packet to the virtual switch for transmission to the intended recipient.

At step 418, if the packet is blocked, the distributed firewall system prevents the packet from being sent to the intended recipient.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. For a virtual machine executing on a host computer, a method for providing firewall services on the host computer, the method comprising:
    for a network connection, receiving a record associating a set of header values of packets sent from the virtual machine with an identifier associated with a process associated with the network connection;
    associating a packet received from the virtual machine with the identifier by comparing the packet's set of header values with the set of header values of the record;
    using the identifier to identify a firewall rule from a plurality of firewall rules that have rule identifiers defined by reference to a plurality of identifiers;
    performing a firewall operation on the received packet based on the identified firewall rule by forwarding the packet to a virtual switch executing on the host computer for distribution to a destination of the packet, the virtual switch being configured to apply routing policies based on a user identity and a group membership.

2. The method of claim 1, wherein performing the firewall operation comprises forwarding the received packet when the identified firewall rule specifies that the packet should be allowed to pass through.

3. The method of claim 1, wherein performing the firewall operation comprises dropping the received packet when the identified firewall rule specifies that the packet should be blocked.

4. The method of claim 1, wherein performing the firewall operation comprises redirecting the received packet to a different destination according to the identified firewall rule.

5. The method of claim 1, wherein the identifier is a security identifier (SID) of a user associated with the process.

6. The method of claim 1, wherein the identifier identifies a user logged onto the machine on which the process executes.

7. The method of claim 1, wherein the identifier comprises a username or a group identifier that identifies a user group to which the user belongs.

8. The method of claim 1 further comprising storing the record that associates the identifier with the set of header values before associating the packet with the identifier.

9. The method of claim 8, wherein the set of header values are associated with the network connection, and comprise an Internet Protocol (IP) address and one or more port numbers assigned to the network connection.

10. The method of claim 8 further comprising configuring a guest driver module executing on the machine to perform the operation of the identified firewall rule for subsequent packets that belong to a same flow as the received packet.

11. A non-transitory machine readable medium storing a program for execution by at least one processing unit, the program for providing firewall services for a virtual machine executing on a host computer, the program comprising sets of instructions for:
    for a network connection, receiving a record associating a set of header values of packets sent from the machine with an identifier associated with a process associated with the network connection;
    associating a packet received from the machine with the identifier by comparing the packet's set of header values with the set of header values of the record;
    using the identifier to identify a firewall rule from a plurality of firewall rules that have rule identifiers defined by reference to a plurality of identifiers;

performing a firewall operation on the received packet based on the identified firewall rule by forwarding the packet to a virtual switch executing on the host computer for distribution to a destination of the packet, the virtual switch being configured to apply routing policies based on a user identity and a group membership.

12. The non-transitory machine readable medium of claim 11, wherein the set of instructions for performing the firewall operation comprises a set of instructions for forwarding the received packet when the identified firewall rule specifies that the packet should be allowed to pass through.

13. The non-transitory machine readable medium of claim 12, wherein the set of instructions for forwarding the received packet comprises a set of instructions for forwarding the packet to a virtual switch executing on the host computer for distribution to a destination of the packet.

14. The non-transitory machine readable medium of claim 11, wherein the set of instructions for performing the firewall operation comprises a set of instructions for dropping the received packet when the identified firewall rule specifies that the packet should be blocked.

15. The non-transitory machine readable medium of claim 11, wherein the set of instructions for performing the firewall operation comprises a set of instructions for redirecting the received packet to a different destination according to the identified firewall rule.

16. The non-transitory machine readable medium of claim 11, wherein the identifier is a security identifier (SID) of a user associated with the process.

17. The non-transitory machine readable medium of claim 11, wherein the identifier identifies a user logged onto the machine on which the process executes.

18. The non-transitory machine readable medium of claim 11, wherein the identifier comprises a username or a group identifier that identifies a user group to which the user belongs.

* * * * *